United States Patent
Shinkaji et al.

(10) Patent No.: US 11,475,816 B2
(45) Date of Patent: Oct. 18, 2022

(54) IMAGE PROCESSOR, DISPLAY DEVICE HAVING THE SAME AND OPERATION METHOD OF DISPLAY DEVICE

(71) Applicant: Samsung Display Co., Ltd., Yongin-Si (KR)

(72) Inventors: Yasuhiko Shinkaji, Yokohama (JP); Kazuhiro Matsumoto, Yokohama (JP); Masahiko Takiguchi, Yokohama (JP)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/509,103

(22) Filed: Oct. 25, 2021

(65) Prior Publication Data

US 2022/0254287 A1 Aug. 11, 2022

(30) Foreign Application Priority Data

Feb. 9, 2021 (KR) .................. 10-2021-0018484

(51) Int. Cl.
*G09G 3/20* (2006.01)
*G06T 7/194* (2017.01)

(52) U.S. Cl.
CPC .............. *G09G 3/20* (2013.01); *G06T 7/194* (2017.01); *G06T 2207/20084* (2013.01); *G09G 2320/0257* (2013.01)

(58) Field of Classification Search
CPC .. G09G 3/20; G09G 2320/0257; G06T 7/194; G06T 2207/20084
See application file for complete search history.

(56) References Cited

U.S. PATENT DOCUMENTS 7,483,484 B2 1/2009 Liu et al.
2020/0265569 A1 8/2020 Lee et al.
(Continued)

FOREIGN PATENT DOCUMENTS

KR 10-0584605 B1 5/2006
KR 10-1195978 B1 10/2012
(Continued)

OTHER PUBLICATIONS

Olaf Ronneberger, Philipp Fischer, and Thomas Brox, "U-Net: Convolutional Networks for Biomedical Image Segmentation", U-Net paper, Submitted on May 18, 2015, 8 pages, arXiv: 1505.04597 [cs.CV], Computer Science Department and BIOSS Centre for Biological Signalling Studies, Cornell University, New York, United States of America, https://arxiv.org/abs/1505.04597.
(Continued)

*Primary Examiner* — Sejoon Ahn
(74) *Attorney, Agent, or Firm* — Innovation Counsel LLP

(57) ABSTRACT

Disclosed is an image processor of a display device including a segmentation processing module classifying a background and a text of an image signal and outputting a segmentation signal, a class classification processing module outputting a class signal based on the segmentation signal, a memory storing broadcast information signals, a correction processing module correcting an image signal based on the segmentation signal and a broadcast information signal corresponding to the class signal among the broadcast information signals and outputting a correction segmentation signal, and a data signal output module preventing an afterimage of the image signal based on the correction segmentation signal and outputting a data signal.

20 Claims, 10 Drawing Sheets

(56) References Cited

U.S. PATENT DOCUMENTS

2020/0286615 A1* 9/2020 Hartung ................ G06T 7/0016
2020/0286922 A1* 9/2020 Huang ................... H05K 1/189

FOREIGN PATENT DOCUMENTS

KR  10-2019-0036168 A   4/2019
WO        20027457 A1   2/2020

OTHER PUBLICATIONS

Hengshuang Zhao, Xiaojuan Qi, Xiaoyong Shen, Jianping Shi, and Jiaya Jia at the Chinese University of Hong Kong, "ICNet for Real-Time Semantic Segmentation on High-Resolution Images", ECCV 2018, ICNet, Submitted on Apr. 27, 2017 (v1), last revised Aug. 20, 2018 (v2), 16 pages, arXiv: 1704.08545 [cs.CV], Computer Vision and Pattern Recognition, Cornell University, New York, United States of America, https://arxiv.org/abs/1704.08545.

\* cited by examiner

IMAGE PROCESSOR, DISPLAY DEVICE HAVING THE SAME AND OPERATION METHOD OF DISPLAY DEVICE

CROSS-REFERENCE TO RELATED APPLICATIONS

This application claims priority under 35 U.S.C. § 119 to Korean Patent Application No. 10-2021-0018484 filed on Feb. 9, 2021, in the Korean Intellectual Property Office, the disclosures of which are incorporated by reference herein in their entireties.

BACKGROUND

The present disclosure generally relates to a display device, and more particularly, relates to a display device including an image processor to improve display quality and a method of the same.

In general, a display device includes a display panel for displaying an image and a driving circuit for driving the display panel. The display panel includes a plurality of scan lines, a plurality of data lines, and a plurality of pixels. The driving circuit includes a data driving circuit that outputs data driving signals to the data lines, a scan driving circuit that outputs scan signals for driving the scan lines, and a driving controller for controlling the data driving circuit and the scan driving circuit.

This display device may display an image by outputting a scan signal to a scan line connected to a pixel to be displayed and providing a data line connected to the pixel with a data voltage corresponding to the image to be displayed.

When the same image is displayed on the display device for a long time, a feature of the pixel may be changed. In particular, when the same image is displayed for a long time and then is changed to another image, an afterimage in which a previous image affects a next image may appear.

SUMMARY

Embodiments of the present disclosure provide an image processor and a display device that are capable of improving display quality.

Embodiments of the present disclosure provide an operation method of a display device capable of improving display quality.

According to an embodiment, an image processor includes a segmentation processing part classifying a background and a text of an image signal and outputting a segmentation signal, a class classification processing part outputting a class signal based on the segmentation signal, a memory storing broadcast information signals, a correction processing part correcting the segmentation signal based on a broadcast information signal corresponding to the class signal from among the broadcast information signals and outputting a correction segmentation signal, and a data signal output part preventing an afterimage of the image signal based on the correction segmentation signal and outputting a data signal.

In an embodiment, the segmentation processing part and the class classification processing part may be implemented by a deep neural network (DNN).

In an embodiment, the class classification processing part may output the class signal corresponding to one of a plurality of broadcasts based on the segmentation signal.

In an embodiment, the broadcast information signals may include image information, in which a background and a text of each of the plurality of broadcasts are distinguished from each other.

In an embodiment, the correction processing part may determine a coincidence between the segmentation signal and the broadcast information signal corresponding to the class signal from among the broadcast information signals, and may output the segmentation signal as the correction segmentation signal when the coincidence is lower than a reference value.

In an embodiment, the correction processing part may compare the segmentation signal with the broadcast information signal corresponding to the class signal from among the broadcast information signals, and may extract a misdetection area and an undetected area of the segmentation signal.

In an embodiment, the correction processing part may convert the misdetection area of the segmentation signal into the background and may convert the undetected area into the text.

In an embodiment, the correction processing part may extract a connection component of the undetected area, and may convert the undetected area into the text when an area of the connection component is smaller than a threshold value.

According to an embodiment, a display device includes a display panel including a plurality of pixels connected to a plurality of data lines and a plurality of scan lines, a data driving circuit driving the plurality of data lines, a scan driving circuit driving the plurality of scan lines, and a driving controller receiving a control signal and an image signal and controlling the data driving circuit and the scan driving circuit such that an image is displayed on the display panel. The driving controller may include a segmentation processing part classifying a background and a text of the image signal and outputting a segmentation signal, a class classification processing part outputting a class signal based on the segmentation signal, a memory storing broadcast information signals, a correction processing part correcting the segmentation signal based on a broadcast information signal corresponding to the class signal from among the broadcast information signals and outputting a correction segmentation signal, and a data signal output part preventing an afterimage of the image signal based on the correction segmentation signal and outputting a data signal.

In an embodiment, the class classification processing part may output the class signal corresponding to one of a plurality of broadcasts based on the segmentation signal.

In an embodiment, the broadcast information signals may include image information, in which a background and a text of each of the plurality of broadcasts are distinguished from each other.

In an embodiment, the correction processing part may determine a coincidence between the segmentation signal and the broadcast information signal corresponding to the class signal from among the broadcast information signals, and may output the segmentation signal as the correction segmentation signal when the coincidence is lower than a reference value.

In an embodiment, the correction processing part may compare the segmentation signal with the broadcast information signal corresponding to the class signal from among the broadcast information signals, and may extract a misdetection area and an undetected area of the segmentation signal.

In an embodiment, the correction processing part may convert the misdetection area of the segmentation signal into the background and may convert the undetected area into the text.

According to an embodiment, an operation method of a display device includes classifying a background and a text of an image signal and outputting a segmentation signal, outputting a class signal based on the segmentation signal, outputting a correction segmentation signal obtained by correcting the segmentation signal based on a broadcast information signal corresponding to the class signal from among the broadcast information signals, and preventing an afterimage of the image signal based on the correction segmentation signal.

In an embodiment, the broadcast information signals may include image information, in which a background and a text of each of the plurality of broadcasts are distinguished from each other.

In an embodiment, the outputting of the correction segmentation signal may include determining a coincidence between the segmentation signal and the broadcast information signal corresponding to the class signal from among the broadcast information signals, and, when the coincidence is lower than a reference value, outputting the segmentation signal as the correction segmentation signal.

In an embodiment, the outputting of the correction segmentation signal may include extracting a misdetection area and an undetected area of the segmentation signal when the coincidence is higher than or equal to the reference value.

In an embodiment, the outputting of the correction segmentation signal may include converting the misdetection area of the segmentation signal into the background and converting the undetected area into the text.

In an embodiment, the outputting of the correction segmentation signal may include extracting a connection component of the undetected area, and converting the undetected area into the text when an area of the connection component is smaller than a threshold value.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
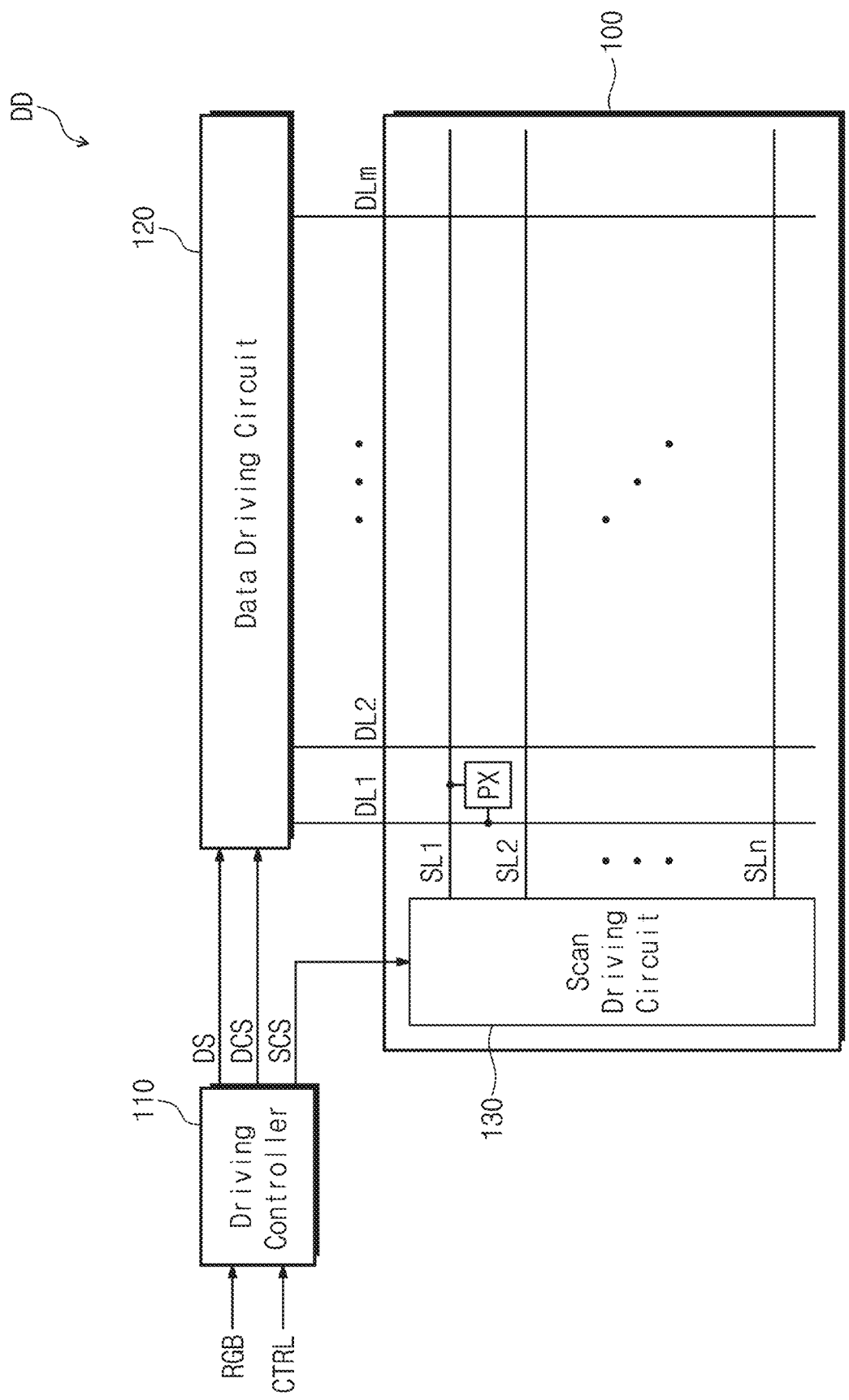
FIG. 1 illustrates a display device according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in commonly used dictionaries should be interpreted as having a meaning consistent with the meaning in the context of the related technology, and is explicitly defined herein unless interpreted in ideal or overly formal meanings.

Hereinafter, embodiments of the present disclosure will be described with reference to accompanying drawings.

FIG. 1 illustrates a display device according to an embodiment of the present disclosure.

Referring to FIG. 1, a display device DD includes a display panel 100, a driving controller 110, and a data driving circuit 120.

The display panel 100 includes a scan driving circuit 130, a plurality of pixels PX, a plurality of data lines DL1 to DLm, and a plurality of scan lines SL1 to SLn. Each of the plurality of pixels PX is connected to the corresponding data line among the plurality of data lines DL1 to DLm, and is connected to the corresponding scan line among the plurality of scan lines SL1 to SLn.

The display panel 100 may be a panel that displays an image, and may be a liquid crystal display (LCD) panel, an electrophoretic display panel, an organic light emitting diode (OLED) panel, a light emitting diode (LED) panel, an inorganic electro luminescent (EL) display panel, a field emission display (FED) panel, a surface-conduction electron-emitter display (SED) panel, a plasma display panel (PDP), or a cathode ray tube (CRT) display panel. Hereinafter, a display device according to an embodiment of the present disclosure is described as an OLED panel, and the display panel 100 is also described as an OLED panel. However, the display device DD and the display panel 100 according to an embodiment of the present disclosure are not limited thereto. For example, the display device DD and the display panel 100 that have various types may be used.

The driving controller 110 receives an image signal RGB from the outside and a control signal CTRL for controlling the display of the image signal RGB. For example, the control signal CTRL may include at least one synchronization signal and at least one clock signal. The driving controller 110 provides the data driving circuit 120 with a data signal DS that is obtained by processing the image signal RGB depending on operating conditions of the display panel 100. Depending on the control signal CTRL, the driving controller 110 provides a first control signal DCS to the data driving circuit 120 and provides a second control signal SCS to the scan driving circuit 130. The first control signal DCS may include a horizontal synchronization start signal, a clock signal, and a line latch signal; and, the second control signal SCS may include a vertical synchronization start signal and an output enable signal.

The data driving circuit 120 may output grayscale voltages for driving the plurality of data lines DL1 to DLm in response to the first control signal DCS and the data signal DS that are received from the driving controller 110. In an embodiment, the data driving circuit 120 may be implemented as an integrated circuit (IC). The data driving circuit 120 may be directly mounted in a predetermined area of the display panel 100 or may be mounted on a separate printed circuit board in a chip on film (COF) scheme, and then may be electrically connected to the display panel 100. In an embodiment, the data driving circuit 120 may be formed in the same process as a driving circuit of the pixels PX on the display panel 100.

The scan driving circuit 130 drives the plurality of scan lines SL1 to SLn in response to the second control signal SCS from the driving controller 110. In an embodiment, the scan driving circuit 130 may be formed in the same process as a driving circuit of the pixels PX on the display panel 100, but is not limited thereto. For example, the scan driving circuit 130 may be implemented as an IC. The scan driving circuit 130 may be directly mounted in a predetermined area of the display panel 100 or may be mounted on a separate printed circuit board in a COF scheme, and then may be electrically connected to the display panel 100.

Figure 2:
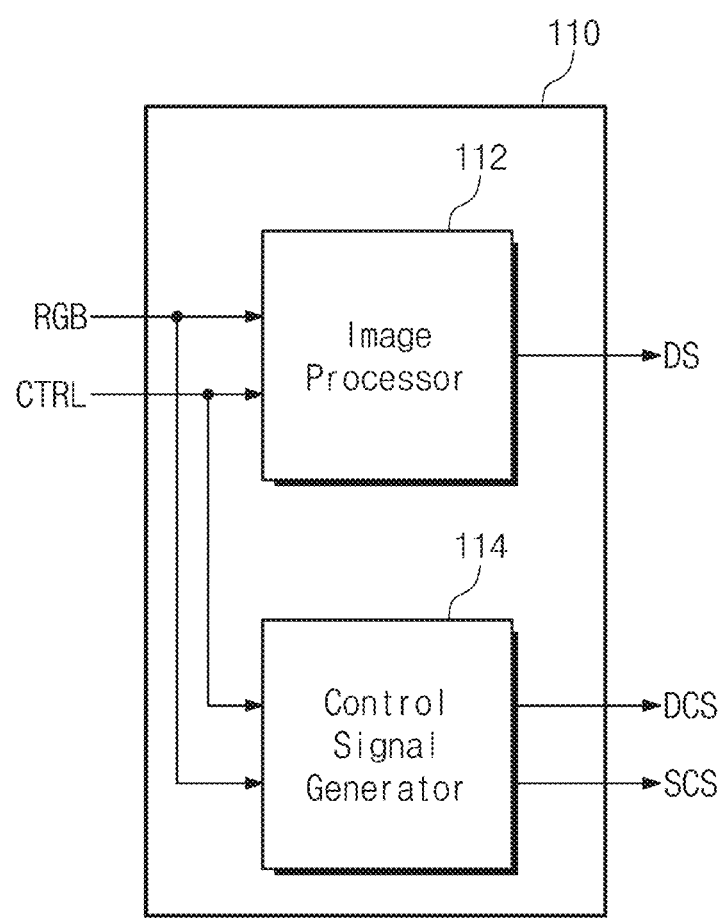
FIG. 2 is a block diagram of a driving controller according to an embodiment of the present disclosure.

FIG. 2 is a block diagram of a driving controller according to an embodiment of the present disclosure.

As illustrated in FIG. 2, the driving controller 110 includes an image processor 112 and a control signal generator 114.

The image processor 112 outputs the data signal DS in response to the image signal RGB and the control signal CTRL.

The control signal generator 114 outputs the first control signal DCS and the second control signal SCS in response to the image signal RGB and the control signal CTRL.

Figure 3:
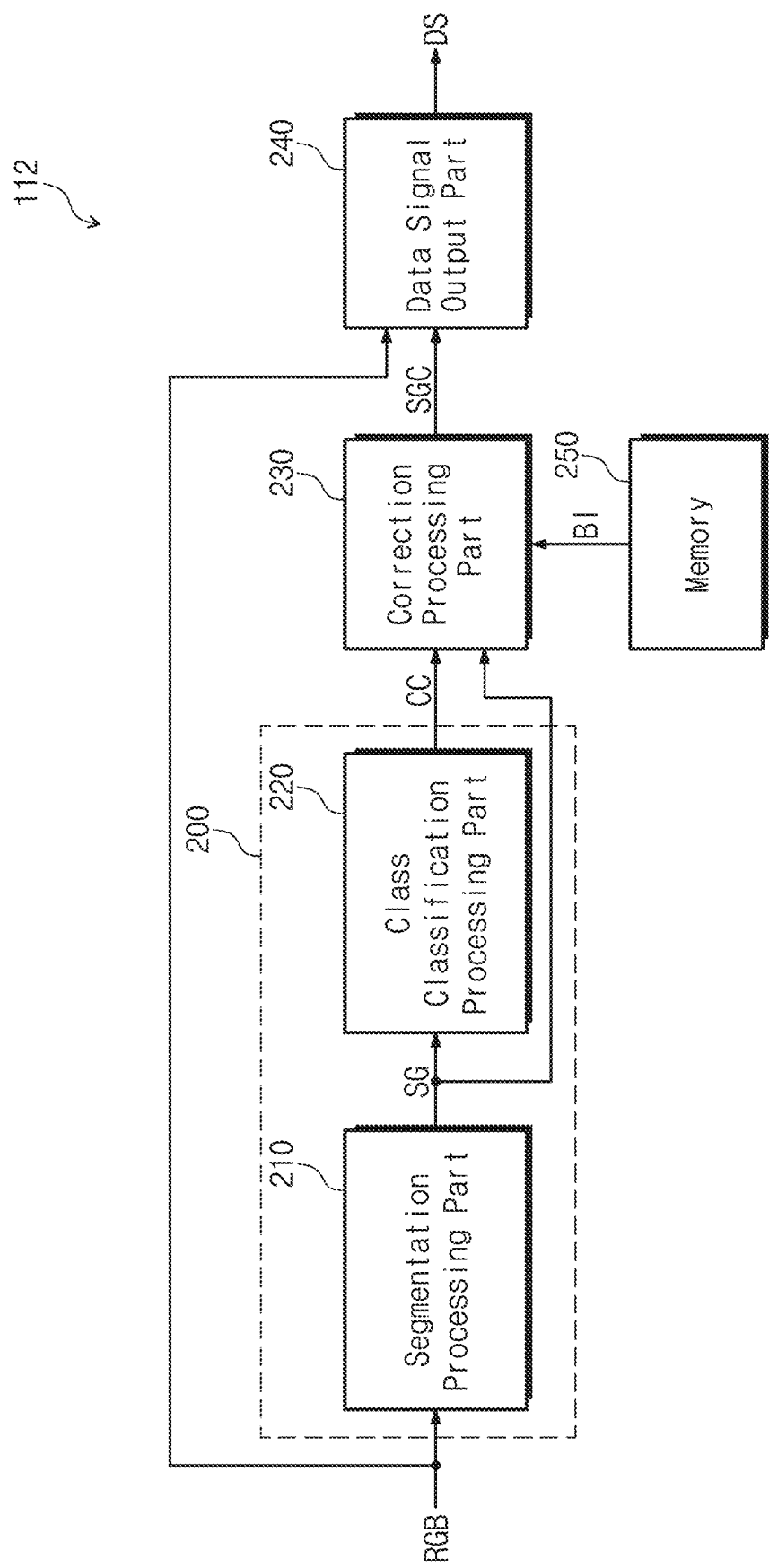
FIG. 3 is a block diagram of an image processor according to an embodiment of the present disclosure.

FIG. 3 is a block diagram of an image processor according to an embodiment of the present disclosure.

Referring to FIG. 3, the image processor 112 includes a segmentation processing part 210, a class classification processing part 220, a correction processing part 230, a data signal output part 240, and a memory 250.

The segmentation processing part 210 and the class classification processing part 220 may be implemented by applying a semantic segmentation technology by a deep neural network (DNN) 200. The segmentation processing part 210 classifies a background and a text of the image signal RGB, and outputs a segmentation signal SG.

The class classification processing part 220 outputs a class signal CC based on the segmentation signal SG. The class classification processing part 220 may output the class signal CC corresponding to one of a plurality of broadcasts based on the segmentation signal SG.

The memory 250 stores preset broadcast information signals. The broadcast information signals may include image information, in which a background is distinguished from a text, about a channel corresponding to each of the plurality of broadcasts, a broadcast program, or a logo of a broadcasting station.

The correction processing part 230 receives the segmentation signal SG from the segmentation processing part 210, the class signal CC from the class classification processing part 220, and a broadcast information signal BI corresponding to the class signal CC among broadcast information signals from the memory 250. The correction processing part 230 corrects the segmentation signal SG based on the segmentation signal SG and the broadcast information signal BI, and outputs a correction segmentation signal SGC.

The data signal output part 240 receives the image signal RGB and the correction segmentation signal SGC, and outputs the data signal DS suitable for the display panel 100 (refer to FIG. 1). The data signal DS may be provided to the data driving circuit 120 shown in FIG. 1.

The data signal output part 240 may prevent an afterimage of the image signal RGB based on the correction segmentation signal SGC and may output the data signal DS.

Figure 4:
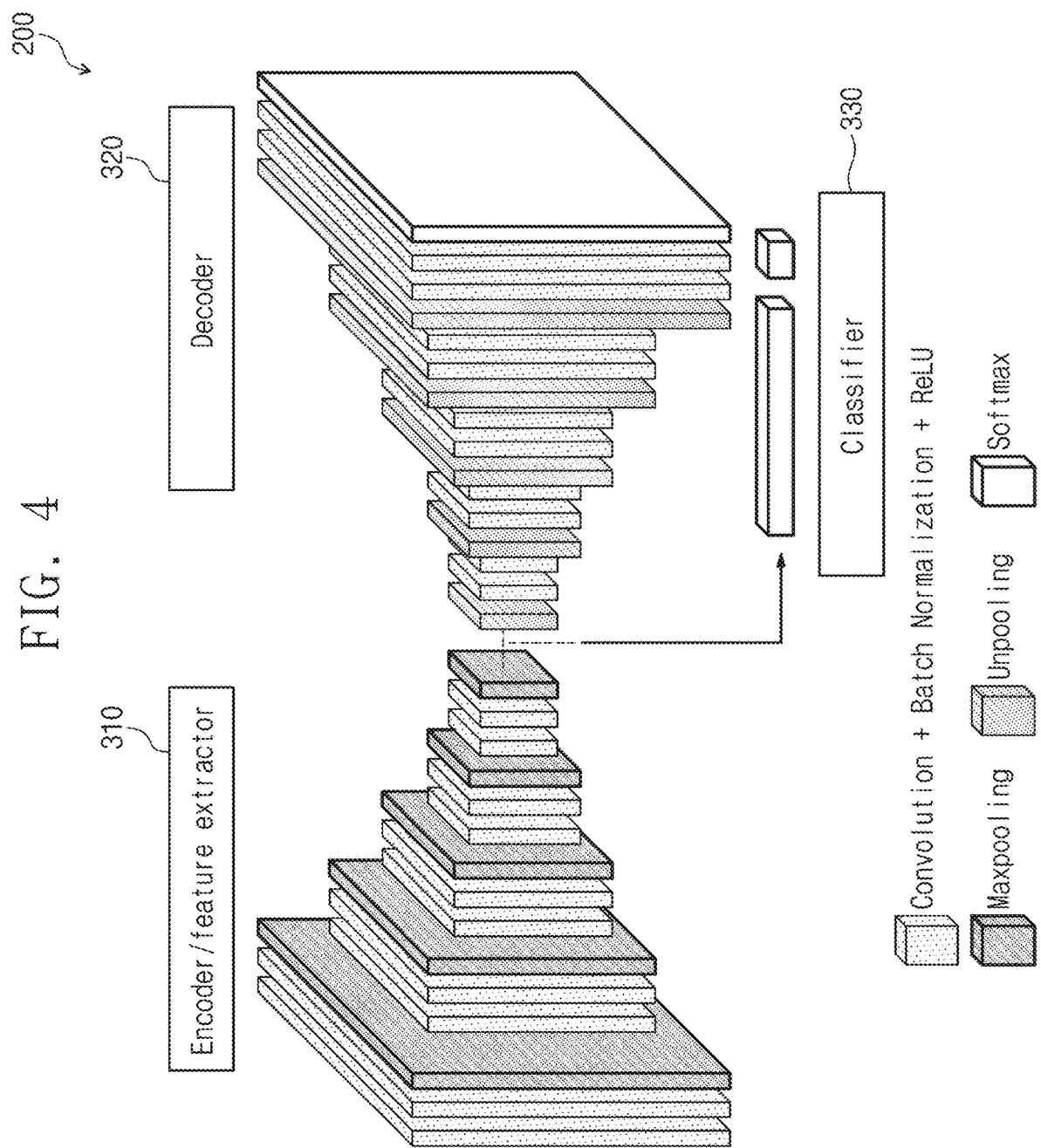
FIG. 4 is a functional block diagram of DNN shown in FIG. 3.

FIG. 4 is a functional block diagram of the DNN 200 shown in FIG. 3.

Referring to FIG. 4, the DNN 200 includes an encoder/feature extractor 310, a decoder 320, and a classifier 330.

Referring to FIGS. 3 and 4, the encoder/feature extractor 310 refers to a network commonly used by the segmentation processing part 210 and the class classification processing part 220. The encoder/feature extractor 310 extracts a feature quantity to be used in segmentation processing and class classification.

The decoder 320 refers to a network used by the segmentation processing part 210, and the classifier 330 refers to a network used by the class classification processing part 220.

The encoder/feature extractor 310 receives the image signal RGB from an external source, and provides feature quantity information of the image signal RGB to the decoder 320 and the classifier 330. The encoder/feature extractor 310 may include a convolution layer, a batch normalization layer, an activation function (ReLU), and maxpooling.

The decoder 320 may classify the class of the image signal RGB based on feature quantity information from the encoder/feature extractor 310.

The decoder 320 may include a convolution layer, a batch normalization layer, an activation function (ReLU), unpooling, and softmax.

The classifier 330 may include a fully connected layer and a softmax.

FIG. 4 illustrates that the encoder/feature extractor 310 uses the same network in common, but the present disclosure is not limited thereto. The encoder and the feature extractor may be implemented as networks independent of each other.

Figure 5A:
FIG. 5A illustrates an image to be entered into a display device.

FIG. 5A illustrates an image to be entered into a display device.

The segmentation processing part 210 illustrated in FIG. 3 may receive the image signal RGB corresponding to an image IM11 as illustrated in FIG. 5A. The image IM11 may include broadcasting station information such as a logo of a broadcasting station. The segmentation processing part 210 classifies a class of the image signal RGB and outputs the segmentation signal SG indicating the class.

The class classification by the segmentation processing part 210 includes classifying a background and a text.

Figure 5B:
FIGS. 5B and 5C are diagrams illustrating a result of segmentation of the image illustrated in FIG. 5A.
Figure 5C:
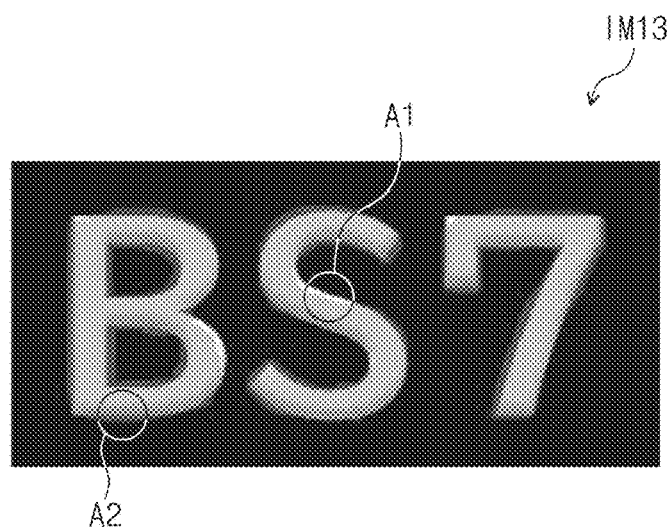

FIGS. 5B and 5C are diagrams illustrating a result of segmentation of the image illustrated in FIG. 5A.

In an ideal case, as illustrated in FIG. 5B, a background and a text are accurately distinguished from each other in the image IM12 of which the class is classified by the segmentation processing part 210.

However, as illustrated in FIG. 5C, in an image IM13 of which the class is classified by the segmentation processing part 210, a text may be classified as a background, or a background may be classified as a text. An area A1 indicates an area where a text is classified as a background, and an area A2 indicates an area where a background is classified as text.

Figure 6A:
FIG. 6A illustrates an image to be entered into a display device.

FIG. 6A illustrates an image to be entered into a display device.

The segmentation processing part 210 illustrated in FIG. 3 may receive the image signal RGB corresponding to an image IM21 as illustrated in FIG. 6A. The image IM21 may include broadcasting station information such as a logo of a broadcasting station. In an area B1 of the image IM21, the luminance of the background is similar to the luminance of the text.

Figure 6B:
FIGS. 6B and 6C are diagrams illustrating a result of segmentation of the image illustrated in FIG. 6A.
Figure 6C:
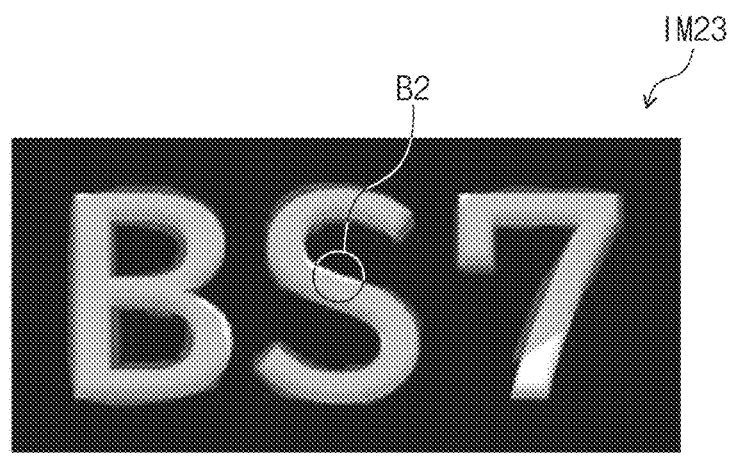

FIGS. 6B and 6C are diagrams illustrating a result of segmentation of the image illustrated in FIG. 6A.

To prevent an afterimage, as illustrated in FIG. 6B, it is appropriate to classify a text of the area B1 as a background. When a portion corresponding to the text of the area B1 is classified as a text, a border appears between the background and the text, which may provide a viewer with the sense of discomfort.

Furthermore, as illustrated in FIG. 6C, in an image IM23 of which the class is classified by the segmentation processing part 210, a text may be classified as a background, or a background may be classified as a text. An area B2 indicates an area where a text is classified as a background.

Figure 7:
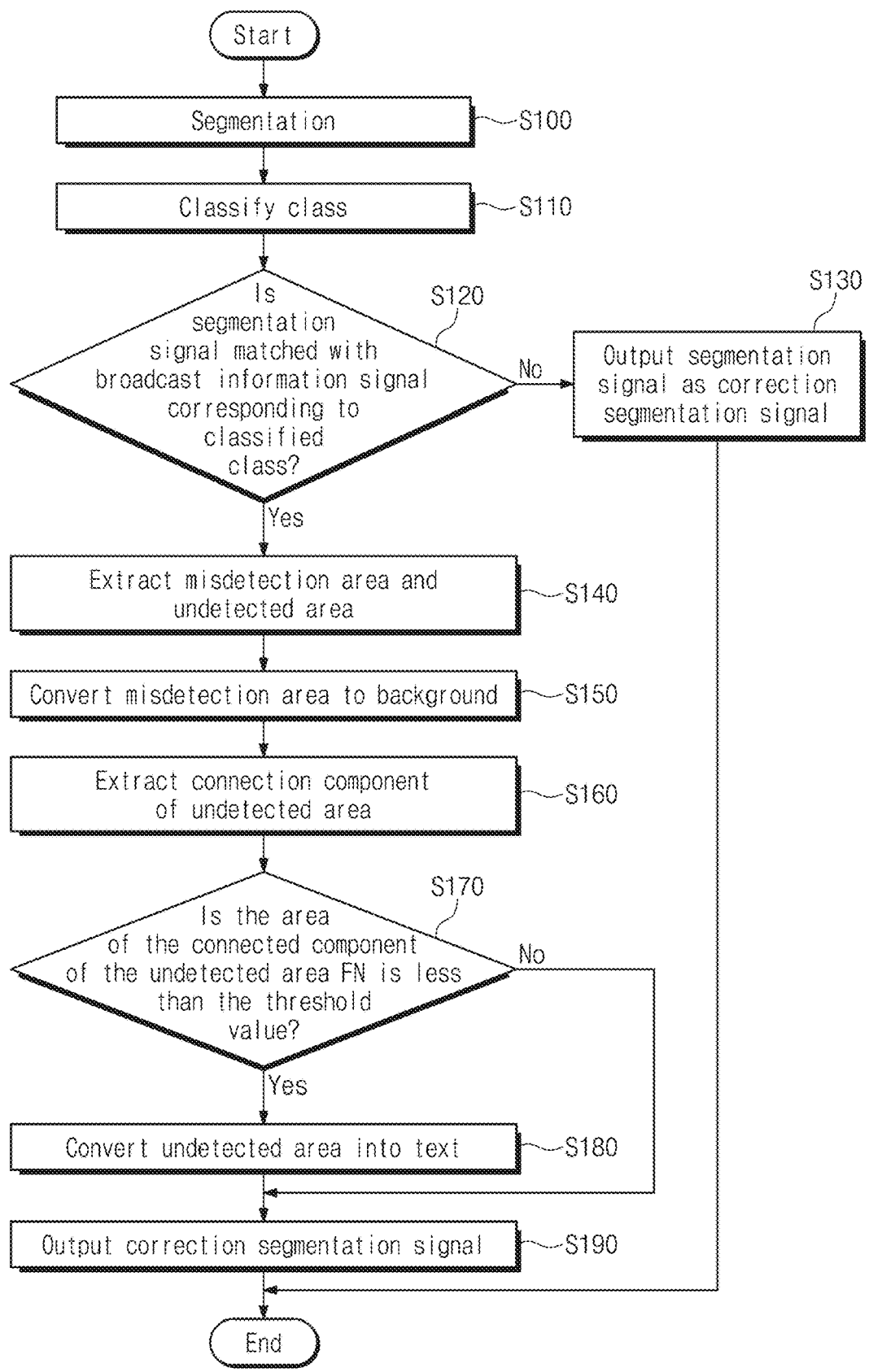
FIG. 7 is a flowchart illustrating an operation method of a display device according to an embodiment of the present disclosure.

FIG. 7 is a flowchart illustrating an operation method of a display device according to an embodiment of the present disclosure.

FIGS. 8A, 8B, 8C, 8D, and to 8E are diagrams for describing an operation method of a display device.

For convenience of description, an operation method of a display device will be described with reference to the display device of FIGS. 1, 2, and 3, but the present disclosure is not limited thereto.

Referring to FIGS. 3 and 7, the segmentation processing part 210 classifies a background and a text of the image signal RGB, and outputs the segmentation signal SG (in operation S100). For example, when the image signal RGB corresponding to each of pixels is a background, the segmentation processing part 210 may output '0' as the segmentation signal SG; when the image signal RGB corresponding to each of the pixels is a text, the segmentation processing part 210 may output '1' as the segmentation signal SG.

The class classification processing part 220 classifies a class based on the segmentation signal SG, and outputs the class signal CC (in operation S110). The class signal CC may correspond to one of a plurality of broadcasts.

The correction processing part 230 receives the segmentation signal SG from the segmentation processing part 210, the class signal CC from the class classification processing part 220, and the broadcast information signal BI from the memory 250. The correction processing part 230 determines whether the segmentation signal SG matches the broadcast information signal BI corresponding to the class signal CC (in operation S120).

For example, the correction processing part 230 may compare a pixel of a text of the segmentation signal SG with a pixel of a text of the broadcast information signal BI corresponding to the class signal CC, and thus a coincidence may be evaluated by calculating the intersection over union (IoU).

When the coincidence between the segmentation signal SG and the broadcast information signal BI is lower than a reference value (that is, the segmentation signal SG does not match the broadcast information signal BI corresponding to the class signal CC in operation S120), the correction processing part 230 outputs the segmentation signal SG as the correction segmentation signal SGC (in operation S130). That is, when the coincidence between a broadcast determined by the class classification processing part 220 and a broadcast stored in the memory is low, the low coincidence indicates a malfunction of the segmentation processing part 210 and/or the class classification processing part 220. Accordingly, the correction processing part 230 outputs the segmentation signal SG as the correction segmentation signal SGC without a separate correction operation.

When the coincidence between the segmentation signal SG and the broadcast information signal BI is higher than or equal to the reference value (that is, the segmentation signal SG match the broadcast information signal BI corresponding to the class signal CC in operation S120), the correction processing part 230 may extract a misdetection area (or false positive) (FP) and an undetected area (or false negative) (FN) by comparing the broadcast information signal BI with the segmentation signal SG (in operation S140).

Figure 8A:
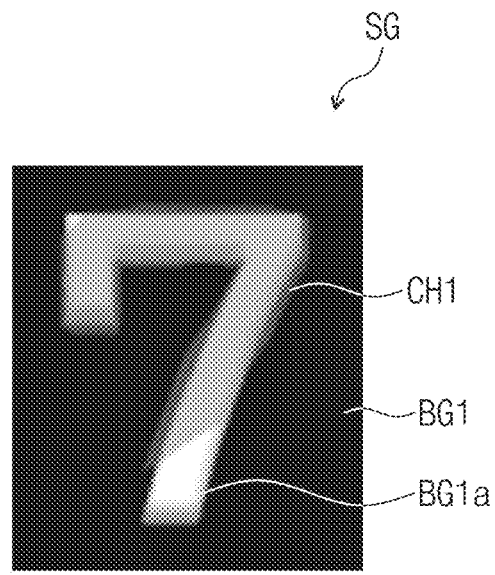
FIG. 8A is an image corresponding to a segmentation signal output from a segmentation processing part.

FIG. 8A is an image corresponding to the segmentation signal SG output from the segmentation processing part 210. In FIG. 8A, an area CH1 refers to an area corresponding to a text of the segmentation signal SG. An area BG1 refers to an area corresponding to a background of the segmentation signal SG. An area BG1a refers to an area corresponding to a text of the image signal RGB or an area corresponding to a background of the segmentation signal SG.

Figure 8B:
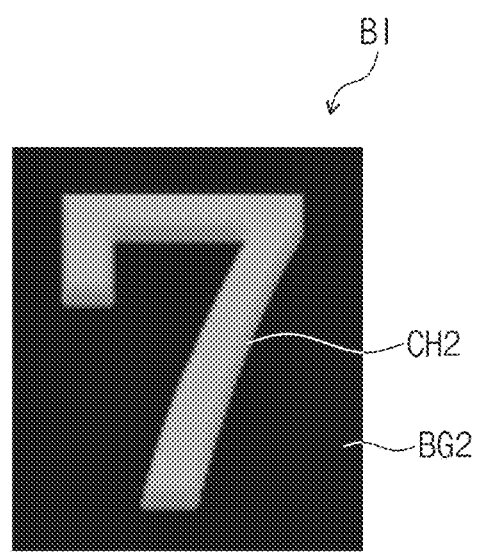
FIG. 8B is an image corresponding to a broadcast information signal stored in a memory.

FIG. 8B is an image corresponding to the broadcast information signal BI stored in the memory 250. In FIG. 8B, an area CH2 refers to an area corresponding to a text of the broadcast information signal BI and, an area BG2 refers to an area corresponding to a background of the broadcast information signal BI.

Figure 8C:
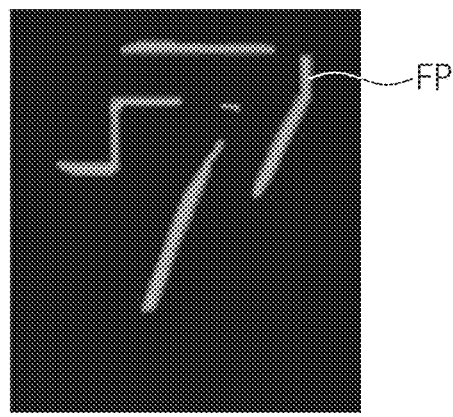
FIG. 8C illustrates a misdetection area in a segmentation signal output from a segmentation processing part.

FIG. 8C illustrates a misdetection area FP in the segmentation signal SG output from the segmentation processing part 210.

The misdetection area FP refers to an area that should have been detected as a background in the segmentation signal SG but is detected as a text.

Figure 8D:
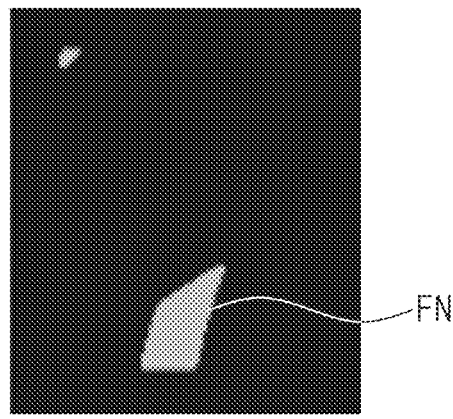
FIG. 8D illustrates an undetected area in a segmentation signal output from a segmentation processing part.

FIG. 8D illustrates an undetected area FN in the segmentation signal SG output from the segmentation processing part 210.

The undetected area FN refers to an area that should have been detected as a text in the segmentation signal SG but is detected as a background.

Referring back to FIG. 7, the correction processing part 230 generates the correction segmentation signal SGC obtained by converting the misdetection area FP in the segmentation signal SG into a background, that is, '0' (in operation S150).

The correction processing part 230 extracts a connection component of the undetected area FN from the segmentation signal SG (in operation S160).

The connected component of the undetected area FN may be implemented by a labeling process or a contour extraction process. Besides, the correction processing part 230 calculates an area of each of the connected components. The area of each of the connected components may be calculated by the number of pixels corresponding to connected components in the segmentation signal SG.

The correction processing part 230 compares an area of the connection component of the undetected area FN in the segmentation signal SG with a threshold value (in operation S170). That is, the operation S170 checks whether the area of the connected component of the undetected area FN is less or greater than the threshold value.

When the area of the connected component of the undetected area FN is less than the threshold value, the correction processing part 230 converts the undetected area FN into a text, that is, '1', in the correction segmentation signal SGC (in operation S180).

The correction processing part 230 outputs the correction segmentation signal SGC to the data signal output part 240 (in operation S190). The correction segmentation signal SGC, after the operations S150, S160, S170, and S180 are sequentially performed, may be obtained by converting the misdetection area FP into a background and converting the undetected area FN into a text.

When the area of the connected component of the undetected area FN is greater than the threshold value in the operation S170, the correction processing part 230 outputs the segmentation signal SG as the correction segmentation signal SGC without performing correction processing (in operation S190). When operation S180 has not been performed, the correction segmentation signal SGC is obtained by converting only the misdetection area FP is into the background, and maintaining the undetected area FN as it is.

When there are a plurality of numbers of connected components extracted in operation S160, an operation of selectively converting an undetected area for each of connection components into a text may be performed while the operations S170, S180, and S190 are performed repeatedly.

Figure 8E:
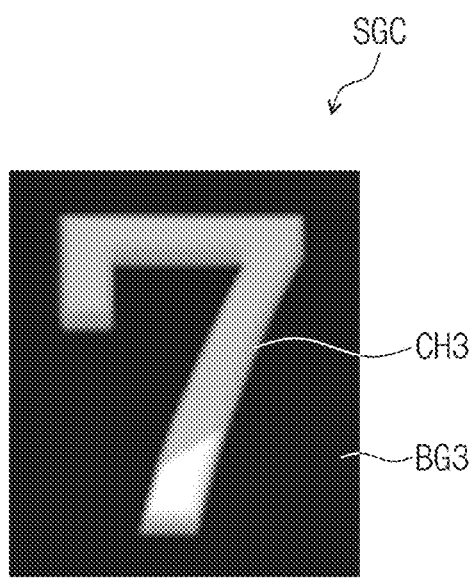
FIG. 8E illustrates an image corresponding to a correction segmentation signal output from a correction processing part.

FIG. 8E illustrates an image corresponding to the correction segmentation signal SGC output from the correction processing part 230.

In FIG. 8E, an area CH3 refers to an area corresponding to a text of the correction segmentation signal SGC; and, an area BG3 refers to an area corresponding to a background of the correction segmentation signal SGC.

When FIG. 8B is compared with FIG. 8E, the correction segmentation signal SGC obtained by correcting the undetected area FN and the misdetection area FP of the segmentation signal SG is similar to the broadcast information signal BI stored in the memory 250.

Furthermore, as described with reference to FIGS. 6A, 6B, and 6C, when the luminance of a background is similar to the luminance of a text, a border between the background and the text may be prevented from being visually perceived by maintaining a text, of which the luminance is similar to the luminance of a background, as the background.

Although described above with reference to an embodiment, it will be understood by those skilled in the art that various modifications and changes may be made in the present disclosure without departing from the spirit and scope of the present disclosure as set forth in the claims below. Furthermore, embodiments of the present disclosure are not intended to limit the technical spirit of the present disclosure. All technical spirits within the scope of the following claims and all equivalents thereof should be construed as being included within the scope of the present disclosure.

A display device having such a configuration may perform a segmentation operation of detecting a background and a text of an image, which causes an afterimage such as a logo of a broadcasting station, and then correcting a misdetection area and an undetected area, thereby improving the accuracy of the segmentation operation. Accordingly, the afterimage prevention performance and display quality of the display device may be improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image processor comprising:
   a segmentation processing module configured to classify a background and a text of an image signal and to output a segmentation signal;
   a class classification processing module configured to output a class signal based on the segmentation signal;
   a memory module configured to store broadcast information signals;
   a correction processing module configured to correct the segmentation signal based on a broadcast information signal corresponding to the class signal from among the broadcast information signals and to output a correction segmentation signal; and
   a data signal output module configured to prevent an afterimage of the image signal based on the correction segmentation signal and to output a data signal.

2. The image processor of claim 1, wherein the segmentation processing module and the class classification processing module are implemented by a deep neural network (DNN).

3. The image processor of claim 1, wherein the class classification processing module outputs the class signal corresponding to one of a plurality of broadcasts based on the segmentation signal.

4. The image processor of claim 3, wherein the broadcast information signals include image information, in which a background and a text of each of the plurality of broadcasts are distinguished from each other.

5. The image processor of claim 4, wherein the correction processing module determines a coincidence between the segmentation signal and the broadcast information signal corresponding to the class signal from among the broadcast information signals, and outputs the segmentation signal as the correction segmentation signal when the coincidence is lower than a reference value.

6. The image processor of claim 1, wherein the correction processing module compares the segmentation signal with the broadcast information signal corresponding to the class signal from among the broadcast information signals, and extracts a misdetection area and an undetected area of the segmentation signal.

7. The image processor of claim 6, wherein the correction processing module converts the misdetection area of the segmentation signal into the background and converts the undetected area into the text.

8. The image processor of claim 7, wherein the correction processing module extracts a connection component of the undetected area, and converts the undetected area into the text when an area of the connection component is smaller than a threshold value.

9. A display device comprising:
a display panel including a plurality of pixels connected to a plurality of data lines and a plurality of scan lines;
a data driving circuit configured to drive the plurality of data lines;
a scan driving circuit configured to drive the plurality of scan lines; and
a driving controller configured to receive a control signal and an image signal and to control the data driving circuit and the scan driving circuit such that an image is displayed on the display panel,
wherein the driving controller includes:
a segmentation processing module configured to classify a background and a text of the image signal and to output a segmentation signal;
a class classification processing module configured to output a class signal based on the segmentation signal;
a memory module configured to store broadcast information signals;
a correction processing module configured to correct the segmentation signal based on a broadcast information signal corresponding to the class signal from among the broadcast information signals and to output a correction segmentation signal; and
a data signal output module configured to prevent an afterimage of the image signal based on the correction segmentation signal and to output a data signal.

10. The display device of claim 9, wherein the class classification processing module outputs the class signal corresponding to one of a plurality of broadcasts based on the segmentation signal.

11. The display device of claim 10, wherein the broadcast information signals include image information, in which a background and a text of each of the plurality of broadcasts are distinguished from each other.

12. The display device of claim 9, wherein the correction processing module determines a coincidence between the segmentation signal and the broadcast information signal corresponding to the class signal from among the broadcast information signals, and outputs the segmentation signal as the correction segmentation signal when the coincidence is lower than a reference value.

13. The display device of claim 9, wherein the correction processing module compares the segmentation signal with the broadcast information signal corresponding to the class signal from among the broadcast information signals, and extracts a misdetection area and an undetected area of the segmentation signal.

14. The display device of claim 13, wherein the correction processing module converts the misdetection area of the segmentation signal into the background and converts the undetected area into the text.

15. An operation method of a display device, the method comprising:
classifying a background and a text of an image signal and outputting a segmentation signal by a segmentation processing module;
classifying a class based on the segmentation signal and outputting a class signal based on the segmentation signal by a class classification processing module;
outputting a correction segmentation signal obtained by correcting the segmentation signal based on the segmentation signal, the class signal, and a broadcast information signals; and
preventing an afterimage of the image signal based on the correction segmentation signal.

16. The method of claim 15, wherein the broadcast information signals include image information, in which a background and a text of each of a plurality of broadcasts are distinguished from each other.

17. The method of claim 15, wherein the outputting of the correction segmentation signal includes:
determining a coincidence between the segmentation signal and the broadcast information signal corresponding to the class signal from among the broadcast information signals; and
outputting the segmentation signal as the correction segmentation signal, when the coincidence is lower than a reference value.

18. The method of claim 17, wherein the outputting of the correction segmentation signal further includes:
extracting a misdetection area and an undetected area of the segmentation signal, when the coincidence is higher than or equal to the reference value.

19. The method of claim 18, wherein the outputting of the correction segmentation signal further includes:
converting the misdetection area of the segmentation signal into the background; and
converting the undetected area into the text.

20. The method of claim 18, wherein the outputting of the correction segmentation signal further includes:
extracting a connection component of the undetected area; and
converting the undetected area into the text, when an area of the connection component is smaller than a threshold value.

* * * * *